US012612966B2

(12) United States Patent
Schorn et al.

(10) Patent No.: US 12,612,966 B2
(45) Date of Patent: Apr. 28, 2026

(54) GEAR-CHANGE SELECTOR MODULE

(71) Applicant: Valeo Powertrain GmbH, Ebern (DE)

(72) Inventors: Andreas Schorn, Ebern (DE); Ralph Berger, Ebern (DE); Gerd Rottenbach, Ebern (DE); Marcel Cornel Girbea, Ebern (DE)

(73) Assignee: Valeo Powertrain GmbH, Ebern (DE)

( * ) Notice: Subject to any disclaimer, the term of this patent is extended or adjusted under 35 U.S.C. 154(b) by 0 days.

(21) Appl. No.: 18/709,552

(22) PCT Filed: Dec. 13, 2022

(86) PCT No.: PCT/EP2022/085498
§ 371 (c)(1),
(2) Date: May 13, 2024

(87) PCT Pub. No.: WO2023/110802
PCT Pub. Date: Jun. 22, 2023

(65) Prior Publication Data
US 2025/0003484 A1 Jan. 2, 2025

(30) Foreign Application Priority Data
Dec. 14, 2021 (DE) .................... 10 2021 133 063.7

(51) Int. Cl.
*F16H 61/00* (2006.01)
*F16H 61/30* (2006.01)

(52) U.S. Cl.
CPC ......... *F16H 61/0009* (2013.01); *F16H 61/30* (2013.01); *F16H 2061/308* (2013.01)

(58) Field of Classification Search
CPC .......... F16H 61/0009; F16H 2061/308; F16H 2057/0206; F16L 39/00; F16L 37/56

USPC ....................................................... 74/473.11
See application file for complete search history.

(56) References Cited

U.S. PATENT DOCUMENTS

| | | | | |
|---|---|---|---|---|
| 5,887,851 A | * | 3/1999 | Trzmiel | F15B 13/0821 |
| | | | | 29/605 |
| 6,357,188 B1 | | 3/2002 | Lee et al. | |
| 7,007,552 B2 | * | 3/2006 | Weise | G01L 15/00 |
| | | | | 73/754 |
| 7,073,825 B2 | * | 7/2006 | Takada | F15B 13/0839 |
| | | | | 137/884 |

(Continued)

FOREIGN PATENT DOCUMENTS

DE 26 12 526 A1 10/1976

OTHER PUBLICATIONS

International Search Report issued Feb. 27, 2023 in PCT/EP2022/085498, filed on Dec. 13, 2022, 3 pages.

(Continued)

*Primary Examiner* — Jake Cook
(74) *Attorney, Agent, or Firm* — Oblon, McClelland, Maier & Neustadt, L.L.P.

(57) ABSTRACT

A gear-change selector module has a pipeline module including a plurality of pipes for providing a working fluid, and a gear-change selector housing having a plurality of channels which are each assigned to one of the pipes. The pipes are coupled to the channels via a respective plug-in connection. Each plug-in connection has a seal. Viewed in the plug-in direction, the seals are arranged at different levels.

21 Claims, 3 Drawing Sheets

(56)     References Cited

U.S. PATENT DOCUMENTS

| 7,201,045 | B2 * | 4/2007 | Dinkel | .................. | B60T 8/3675 |
| | | | | | 73/121 |
| 9,194,634 | B2 * | 11/2015 | Tiberghien | .............. | F16L 37/34 |
| 2002/0163187 | A1 * | 11/2002 | Pelfrey | .............. | F16L 37/0927 |
| | | | | | 285/124.1 |

OTHER PUBLICATIONS

German Search Report issued Jul. 28, 2022 in DE application 10 2021 133 063.7, filed on Dec. 14, 2021, 6 pages (with English Translation of Categories of Cited Documents).

* cited by examiner

AB - AB

GEAR-CHANGE SELECTOR MODULE

BACKGROUND OF THE INVENTION

FIELD OF THE INVENTION

The invention concerns a gear-change selector module with a pipeline module comprising a plurality of pipes for providing a working fluid, and a gear-change selector housing having a plurality of channels which are each assigned to one of the pipes.

DESCRIPTION OF THE RELATED ART

Gear-change selector modules are parts of a transmission mechanism. They serve to create the adjustment movements for shifting between different gears of the transmission. A hydraulically actuated gear-change selector usually has several hydraulic cylinders which are adjusted when a gear is to be selected. The stroke of the pistons is transferred to different shift forks. The pistons of the hydraulic cylinders are pressurized with hydraulic fluid in order to assume predefined piston positions corresponding to different shift positions. The hydraulic fluid is supplied to the separate cylinders in several channels. The channels must be closed pressure-tightly to avoid hydraulic fluid escaping or the pressure falling. In such a case, the function of the gear-change selector module can no longer be reliably guaranteed.

In order to simplify production of the gear-change selector module, the gear-change selector module has a gear-change selector housing and a separate pipeline module with pipes via which hydraulic fluid is provided for the cylinders. For this, the pipeline module is connected to the gear-change selector housing such that the channels of the gear-change selector housing are fluidically connected to pipes of the pipeline module, and thus hydraulic fluid can flow to or from the cylinders through the pipes and via the channels. A tight connection is here ensured by means of seals.

BRIEF SUMMARY OF THE INVENTION

Thus known gear-change selector modules can only be produced at high cost, in particular if the tightness must meet high requirements.

It is therefore an object of the invention to provide an improved gear-change selector module which has a high tightness and can be produced at low cost.

This object is achieved by a gear-change selector module with a pipeline module comprising a plurality of pipes for providing a working fluid, and a gear-change selector housing having a plurality of channels which are each assigned to one of the pipes. The pipes are coupled to the channels via a respective plug-in connection. Furthermore, each plug-in connection has a seal, wherein viewed in the plug-in direction, the seals are arranged at different levels. In this way, when the pipes are connected to the channels, the seals of different levels come into contact with their assigned pipes and channels at different times, so that the mounting force, i.e. the force necessary for connection, is reduced.

In one embodiment, the seals are arranged at precisely two or three different levels. In this way, the mounting force can be effectively reduced. At the same time, the plug-in connection may be relatively short in the plug-in direction and hence the gear-change selector module may be designed compactly.

In addition or alternatively, the distance between two adjacent levels is in each case at least as great as the thickness of a seal of the adjacent levels, viewed in the plug-in direction. This ensures that two adjacent levels have a distance from one another in the plug-in direction which effectively reduces the mounting force.

In a further embodiment, the distance between two adjacent levels is in each case at least as great as the thickness, viewed in the plug-in direction, of the seal with the greatest thickness of the seals of the adjacent levels. This ensures that, on connection, the seals of a following level in the plug-in direction only come into contact with their assigned pipes and channels when the seals of the preceding level in the plug-in direction are already in contact with the assigned pipes and channels.

It may furthermore be provided that precisely two seals are arranged at each level. In this way, the mounting force is particularly effectively reduced.

According to one embodiment, at least two seals are arranged at each level so as to ensure that the force transfer to the components is as even as possible. In particular, in this way, tilt moments are avoided or reduced which could cause the gear-change selector module to tilt relative to the pipeline module on connection, so that the orientation of the gear-change selector module and/or the pipeline module deviates from the orientation provided for connection in the plug-in direction. This ensures a tightness which meets particularly high requirements.

Furthermore, the same number of seals may be arranged at each level so as to adapt the necessary mounting forces of the individual levels to one another and thus structure the mounting process particularly efficiently.

According to a further embodiment, the seals arranged at the same level are arranged mirror-symmetrically to a centre plane of the plug-in connections. In this way, the seals are distributed such that tilt moments during mounting are avoided or reduced and an even loading of the seals is promoted.

In addition or alternatively, viewed in or against the plug-in direction, one seal of a level is arranged between each two adjacent seals of another level, in order to avoid or reduce tilt moments during mounting which could adversely affect the tightness.

In one embodiment, the seals are O-rings. In this way, the mounting forces can be reduced in defined fashion and an effective seal can be reliably provided.

BRIEF DESCRIPTION OF THE SEVERAL VIEWS OF THE DRAWINGS

Further advantages and features will become apparent from the following description and from the appended drawings, in which.

DETAILED DESCRIPTION OF THE INVENTION

Figure 1:
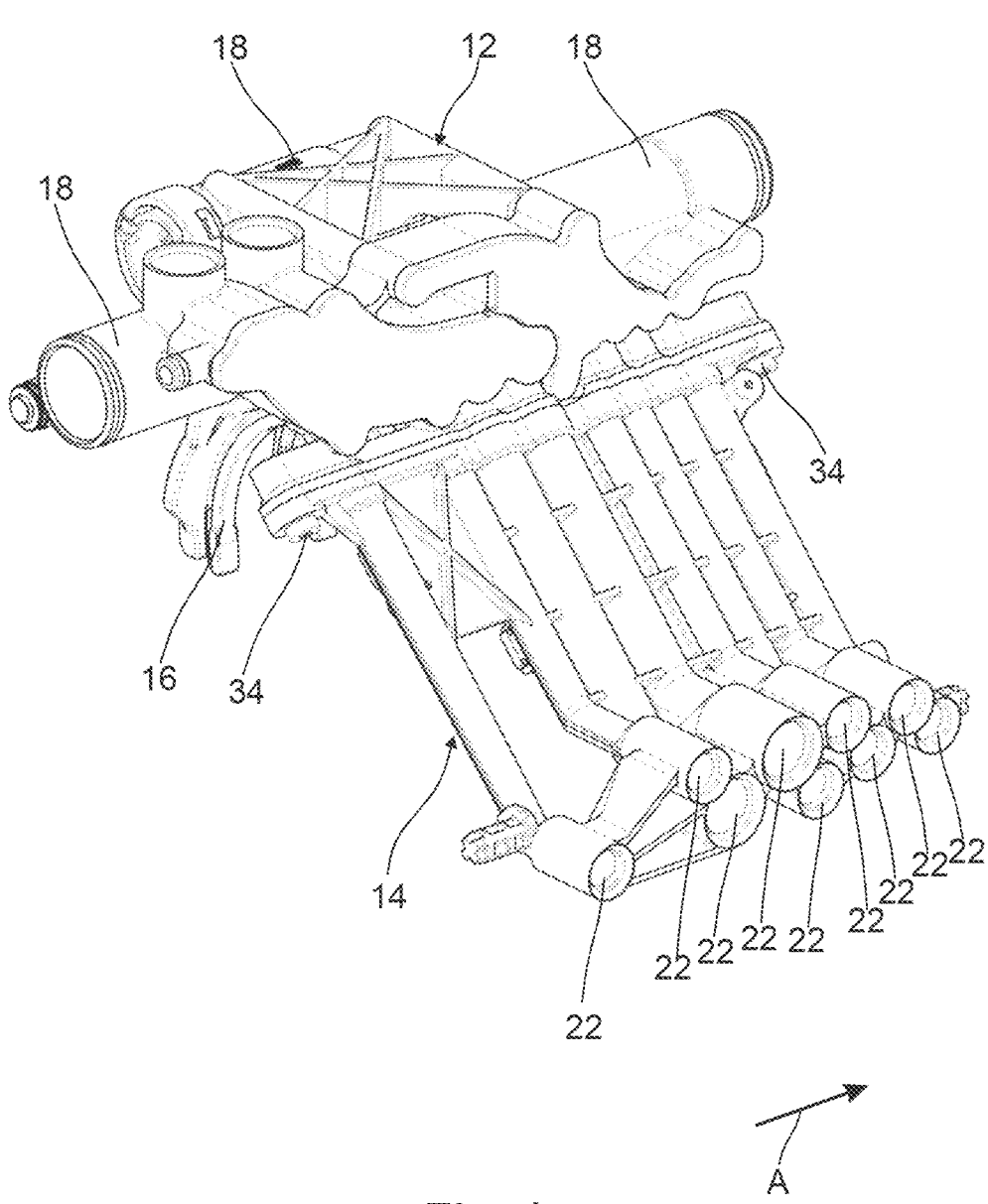
FIG. 1 shows a perspective illustration of a gear-change selector module according to the invention, with a gear-change selector housing and a pipeline module, in mounted state.
Figure 2:
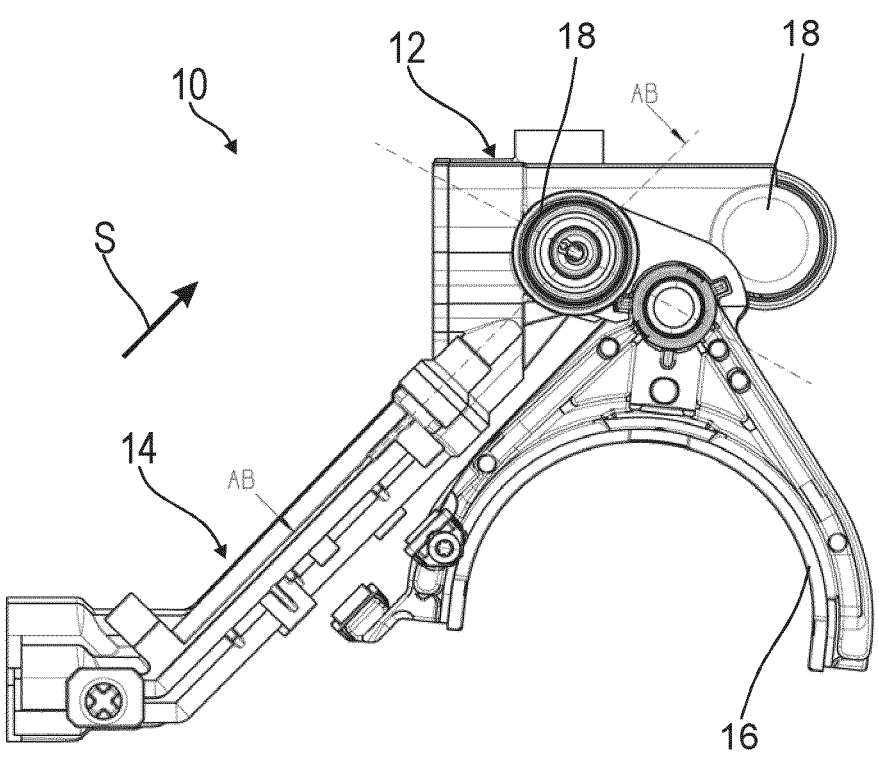
FIG. 2 shows a side view of the gear-change selector module from FIG. 1.

FIG. 1 shows a gear-change selector module 10 for a gearshift of a motor vehicle with a gear-change selector housing 12, a pipeline module 14 and several shift forks 16.

The gear-change selector housing 12 has a plurality of hydraulic cylinders 18 with pistons which are displaceable in the axial direction A and each coupled to a shift fork 16.

Figure 3:
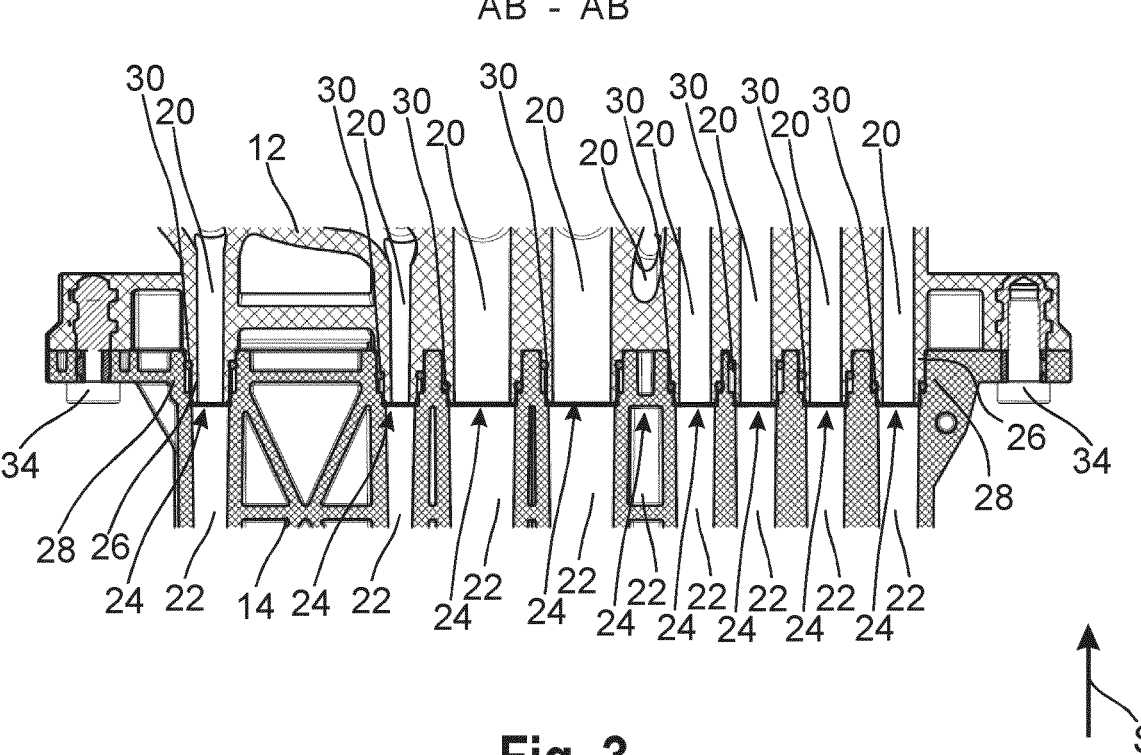
FIG. 3 shows a sectional view of the gear-change selector module along plane AB-AB from FIG. 2.

Furthermore, the gear-change selector housing 12 has a plurality of channels 20 (see FIG. 3) which are each fluidically connected to a pipe 22 of the pipeline module 14 via a plug-in connection 24.

In the present embodiment, the gear-change selector housing 12 has nine channels 20 and the pipeline module 14 has nine pipes 22, which are coupled together accordingly via nine plug-in connections 24.

In principle, the gear-change selector module 10 may have an arbitrary number of channels 20 or pipes 22.

The plug-in connections 24 are here each configured as a male connector 26 (see FIG. 4) in the form of a stub, and a female connector 28 (see FIG. 5) in the form of a socket formed complementarily to the stub, which can be plugged together in a plug-in direction S and thus connected together.

In the embodiment shown, the male connectors 26 are part of the gear-change selector housing 12, while the female connectors 28 are part of the pipeline module 14.

Evidently, in an alternative embodiment, the male connectors 26 of each plug-in connection 24 may be arranged on the gear-change selector housing 12 or on the pipeline module 14, while the assigned female connectors 28 are arranged accordingly opposite on the pipeline module 14 or gear-change selector housing 12.

The pipes 22 and channels 20 form lines of the gear-change selector module 10, via which, during operation of the gear-change selector module 10, a working fluid in the form of a hydraulic fluid is conducted to or from the hydraulic cylinders 18 in order to drive these.

Each plug-in connector 24 therefore has a seal 30 which guarantees a tight connection of the pipes 22 with the channels 20, and thus ensures that under the pressures prevailing in operation, no hydraulic fluid escapes at the connection.

In the present embodiment, each seal 30 is an O-ring.

In principle, the seals 30 may be configured arbitrarily. Preferably, the seals 30 are however at least annular, i.e. closed around a hole in the circumferential direction.

The seals 30 are arranged at a first level 31, a second level 32 and a third level 33, which are spaced apart from another in the plug-in direction S.

The levels 31, 32, 33 here each correspond to a plane standing perpendicularly to the plug-in direction S.

Three of the nine seals 30 are arranged at each of the first level 31, the second level 32 and the third level 33.

Thus each level 31, 32, 33 has the same proportion of seals 30, in the present exemplary embodiment one third or 33.3%.

In an alternative embodiment, the seals 30 may be arranged at any number of levels 31, 32, 33, but at least two, in particular precisely two or three.

Furthermore, an arbitrary number of seals 30 may be arranged at each level 31, 32, 33, preferably however at least two, in particular precisely two or three.

Furthermore, all levels 31, 32, 33 may have the same number of seals 30, so that the proportion of seals 30 on each level 31, 32, 33 is the inverse of the number of levels 31, 32, 33, i.e. a half for two levels 31, 32, 33, a third for three levels 31, 32, 33, a quarter for four levels 31, 32, 33 etc.

Alternatively, the number of seals 30 on at least two levels 31, 32, 33 may differ from one another.

The distance $B_1$ between the first level 31 and the second level 32, and the distance $B_2$ between the second level 32 and the third level 33, are each greater than the thickness D of the seals 30 in the plug-in direction S.

In embodiments with seals 30 of different thickness in the plug-in direction S, the distances $B_1$, $B_2$ between two adjacent levels 31, 32, 33 may in each case be greater than the greatest thickness D in the plug-in direction S of the seal 30 of the two adjacent levels 31, 32, 33.

Figure 4:
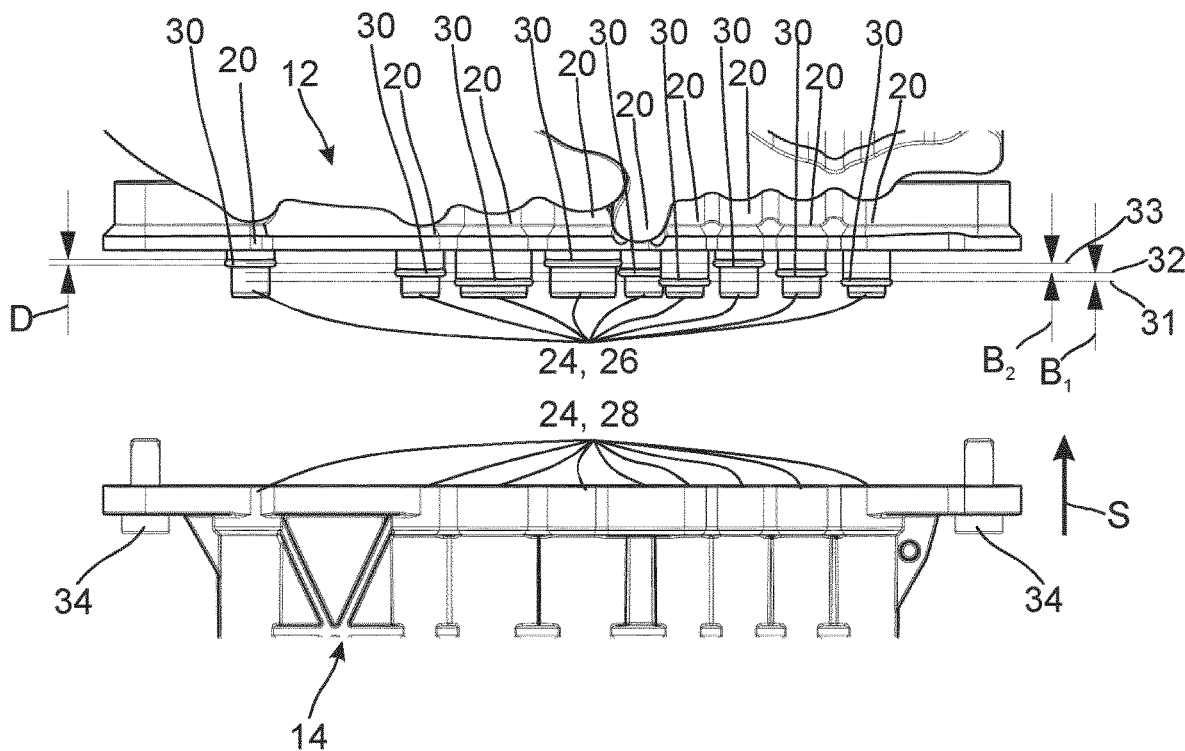
FIG. 4 shows a top view of an extract of the gear-change selector housing and pipeline module in a disconnected state.
Figure 5:
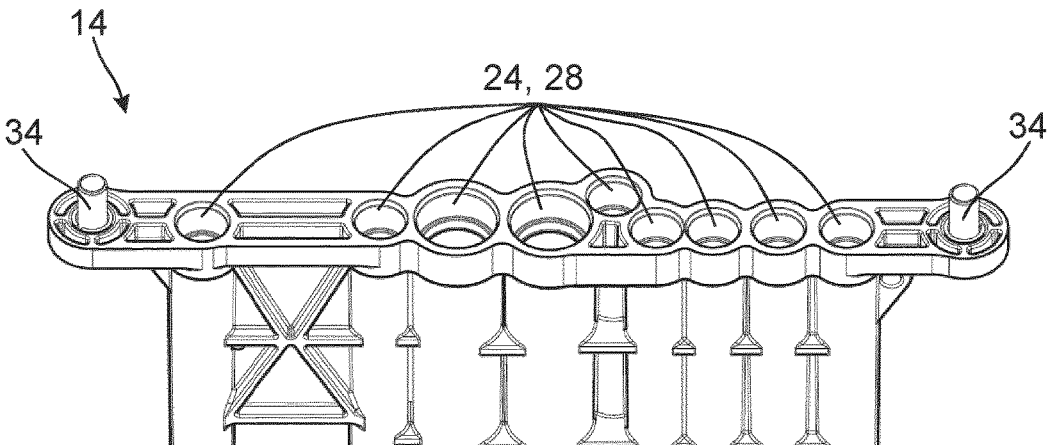
FIG. 5 shows a perspective illustration of the pipeline module in a disconnected state.

As FIG. 4 shows, in the present embodiment, the seals 30 are arranged in a zigzag or step shape, i.e. viewed from right to left in FIG. 4, a seal 30 of the first level 31 is followed by a seal 30 of the second level 32 and then a seal 30 of the third level 33, before the sequence is restarted with a further seal 30 of the first level 31.

If the arrangement of the seals 30 is considered viewed in or against the plug-in direction S, in each case at least one seal 30 of one level 31, 32, 33, in particular precisely one seal 30 of each adjacent level 31, 32, 33, is arranged between two adjacent seals 30 of another level 31, 32, 33.

In addition or alternatively, in a further embodiment, the seals 30 may be arranged mirror-symmetrically to a centre plane of the plug-in connections 24.

To produce the gear-change selector module 10, the pipeline module 14 is connected to the gear-change selector housing 12 in the plug-in direction S so that the mutually assigned channels 20 and pipes 22 are connected together via a respective plug-in connection 24.

For this, the pipeline module 14 is pushed onto the gear-change selector housing 12 in the plug-in direction S until the male connectors 26 engage in the assigned female connectors 28, and the seals 30 of the first level 31 lie against both their assigned male connectors 26 and also the corresponding female connectors 28.

To overcome the resistance formed by the seals 30 of the first level 31, the pipeline module 14 is now pushed further onto the gear-change selector housing 12 in the plug-in direction S with a first force, until the seals 30 of the second level 32 lie against their assigned male connectors 26 and the corresponding female connectors 28.

At this point, the pipeline module 14 is pushed further onto the gear-change selector housing 12 in the plug-in direction S with a second force, in order to overcome the additional resistance formed by the seals 30 of the second level 32.

As soon as the seals of a third level 33 lie against their assigned male connectors 26 and female connectors 28, the pipeline module 14 is pushed in the plug-in direction S with a third force, in order to overcome the additional resistance formed by the seals 30 of the third level 33.

The second force is here greater than the first force and smaller than the third force.

In particular, the first force, the second force and the third force are each smaller than the force which would be necessary to overcome the seals 30 if they were all arranged at a single level 31, 32, 33.

When the pipeline module 14 is fully connected to the gear-change selector housing 12, for example when the pipeline module 14 and gear-change selector housing 12 lie against one another at a stop, the gear-change selector housing 12 and the pipeline module 14 are finally fixed together in the plug-in direction S by means of two fixing elements 34, here in the form of screws.

In the present embodiment, during connection, the seals 30 are each arranged on the male connectors 26.

In principle, during connection, each seal 30 may be arranged on its assigned male connector 26 or female connector 28. The levels 31, 32, 33 are defined by the connected state (see FIG. 3).

In this way, a gear-change selector module 10 is provided which can be produced at low cost.

Furthermore, the connection between the pipes 22 and channels 20 has a high tightness.

The invention claimed is:

1. A gear-change selector module comprising:
   a pipeline module comprising a plurality of pipes for providing a working fluid, exteriors of the plurality of pipes being mechanically linked together to form the pipeline module; and
   a gear-change selector housing having a plurality of hydraulic cylinders with pistons which are displaceable in an axial direction, and a plurality of channels which are each assigned to one of the pipes,
   wherein each of the pipes includes a first portion perpendicular to the axial direction, and a second portion disposed at a non-zero angle with respect to the first portion,
   wherein the second portions of the pipes are coupled to the channels via a respective plug-in connection,
   wherein each plug-in connection has a seal, and
   wherein when viewed in a direction perpendicular to a plug-in direction, the seals are arranged at different levels in the plug-in direction, the plug-in direction being along the second portion of the pipes.

2. The gear-change selector module according to claim 1, wherein the seals are arranged at precisely two or three different levels.

3. The gear-change selector module according to claim 1, wherein a distance between two adjacent levels is in each case at least as great as a thickness of a seal of the adjacent levels, when viewed in the plug-in direction.

4. The gear-change selector module according to claim 1, wherein a distance between two adjacent levels is in each case at least as great as a thickness, when viewed in the plug-in direction, of the seal with a greatest thickness of the seals of the adjacent levels.

5. The gear-change selector module according to claim 1, wherein precisely two seals are arranged at each level.

6. The gear-change selector module according to claim 1, wherein at least two seals are arranged at each level.

7. The gear-change selector module according to claim 1, wherein the same number of seals is arranged at each level.

8. The gear-change selector module according to claim 1, wherein the seals arranged at the same level are arranged mirror-symmetrically to a center plane of the plug-in connections.

9. The gear-change selector module according to claim 1, wherein when viewed in or against the plug-in direction, one seal of a level is arranged between each two adjacent seals of another level.

10. The gear-change selector module according to claim 1, wherein the seals are O-rings.

11. The gear-change selector module according to claim 2, wherein a distance between two adjacent levels is in each case at least as great as a thickness of a seal of the adjacent levels, when viewed in the plug-in direction.

12. The gear-change selector module according to claim 2, wherein a distance between two adjacent levels is in each case at least as great as a thickness, when viewed in the plug-in direction, of the seal with a greatest thickness of the seals of the adjacent levels.

13. The gear-change selector module according to claim 2, wherein precisely two seals are arranged at each level.

14. The gear-change selector module according to claim 2, wherein at least two seals are arranged at each level.

15. The gear-change selector module according to claim 2, wherein the same number of seals is arranged at each level.

16. The gear-change selector module according to claim 2, wherein the seals arranged at the same level are arranged mirror-symmetrically to a center plane of the plug-in connections.

17. The gear-change selector module according to claim 2, wherein when viewed in or against the plug-in direction, one seal of a level is arranged between each two adjacent seals of another level.

18. The gear-change selector module according to claim 2, wherein the seals are O-rings.

19. The gear-change selector module according to claim 3, wherein a distance between two adjacent levels is in each case at least as great as a thickness, when viewed in the plug-in direction, of the seal with a greatest thickness of the seals of the adjacent levels.

20. The gear-change selector module according to claim 3, wherein precisely two seals are arranged at each level.

21. A gear-change selector module comprising:
   a pipeline module comprising a plurality of pipes for providing a working fluid, exteriors of the plurality of pipes being mechanically linked together to form the pipeline module; and
   a gear-change selector housing having a plurality of channels which are each assigned to one of the pipes,
   wherein the pipes are coupled to the channels via a respective plug-in connection,
   wherein each plug-in connection has a seal,
   wherein when viewed in a direction perpendicular to a plug-in direction, the seals are arranged at different levels in the plug-in direction, and
   wherein a distance between two adjacent levels is in each case at least as great as a thickness of a seal of the adjacent levels, when viewed in the plug-in direction.

* * * * *